United States Patent [19]

Gruner

[11] Patent Number: 4,596,718
[45] Date of Patent: Jun. 24, 1986

[54] VACUUM PLASMA COATING APPARATUS

[75] Inventor: Heiko Gruner, Beinwiel am See, Switzerland

[73] Assignee: Plasmainvent AG, Zug, Switzerland

[21] Appl. No.: 746,105

[22] Filed: Jun. 18, 1985

[30] Foreign Application Priority Data

Jun. 19, 1984 [DE] Fed. Rep. of Germany ....... 3422718

[51] Int. Cl.$^4$ ............................................... B05D 1/08
[52] U.S. Cl. .............................. 427/34; 219/121 PL;
219/121 PX; 427/295; 427/423; 427/425
[58] Field of Search ................. 427/34, 423, 295, 425;
219/121 PL, 121 PX

[56] References Cited

U.S. PATENT DOCUMENTS

| 3,010,009 | 11/1961 | Ducati ................... | 427/34 |
| 3,493,415 | 2/1970 | Grisaffe et al. ........ | 427/34 |
| 3,839,618 | 10/1974 | Muehlberger ......... | 427/34 |
| 4,082,870 | 4/1978 | Yenni ................... | 427/423 |
| 4,328,257 | 5/1982 | Muehlberger et al. ... | 427/34 |
| 4,358,471 | 11/1982 | Derkacs et al. ........ | 427/34 |

Primary Examiner—John H. Newsome
Attorney, Agent, or Firm—Fitzpatrick, Cella, Harper & Scinto

[57] ABSTRACT

A vacuum plasma coating apparatus comprises a plasma torch arranged in a low pressure chamber and displaceable along a plurality of axes relative to the part to be coated and a device for moving the part to be coated with a plurality of degrees of freedom simultaneously with the plasma torch. In order to be able to coat a plurality of parts simultaneously with great effectiveness, a device for moving the part to be coated is constructed in such manner that it can contain a plurality of parts simultaneously, the parts being movable simultaneously and/or sequentially through the plasma jet. In each case the part nearest the plasma torch is arranged in the plasma jet in such manner that this extends at least occasionally laterally beyond an outer dimension of this part and all parts to be coated move within a predetermined spray distance range when they are located in the plasma jet.

11 Claims, 7 Drawing Figures

VACUUM PLASMA COATING APPARATUS

The invention relates to a vacuum plasma coating apparatus comprising, in a low pressure chamber, a plasma torch which is arranged for displacement relative to the part to be coated along a plurality of axes, whilst the part to be coated is arranged for movement simultaneously with the plasma torch with several degrees of freedom.

Such a vacuum plasma coating apparatus is known for example from U.S. Pat. No. 4,328,257. In such apparatus, a plasma torch is driven a low pressure chamber and is arranged for displacement along four axes across the part which is provided for coating in the plasma spray method. Also the part to be coated can be moved simultaneously with the plasma torch with several degrees of freedom so that coating of the substrate surface can be carried out uniformly at all points.

In order also to be able to coat very complicated surface geometries with a desired set coating thickness distribution, movement of the plasma torch has been effected by an industrial robot specially modified for operation in low pressure conditions, as for example described in DVS-Report No. 80 on pages 102, 103 and 104. Together with the substrate movement, thus a freely programmable six axis movement system results between the plasma beam and the substrate surface. A movement programme specially optimised for a predetermined part to be coated with a desired coating thickness distribution is stored on e.g. magnetic tape and can be called up again at any time. Thus, the reproduceability of the movement programme in the coating production is ensured.

In both known installations, it is established that for a given spray powder and the coating parameters selected for this a definite spray distance between plasma torch and substrate must be maintained as was previously practised also with plasma coating in atmosphere. Whenever only one part to be coated is located in the plasma torch/substrate movement programme, the coating takes place with high production costs. A plurality of parts could not previously be coated simultaneously.

The invention is based on the object of providing a vacuum plasma coating installation of the type described in the introduction with which the coating of a plurality of parts with greater effectiveness and improved coating results can be carried out in a shorter time.

This object is achieved with a vacuum plasma coating installation of the type described in the introduction in that according to the invention the device for moving the part to be coated is constructed in such manner that it contains a plurality of parts, in that the parts are movable simultaneously and/or sequentially through the plasma jet, in that in each case the part nearest the plasma torch is arranged in the plasma jet in such manner that this jet extends at least occasionally laterally across an outer dimension of this part, and in that all parts to be coated always move within a predetermined spray distance range when they are located in the plasma jet.

Such a vacuum plasma coating installation has the advantage that a plurality of parts to be coated can be simultaneously subjected to the plasma jet and for all three operations of the vacuum plasma spray:

Sputter cleaning of the substrate surface with the aid of the transferred arc of negative plurality on the substrate, and heating of a probe with the aid of the plasma flame without or with additional energy by the transferred arc of positive polarity on the substrate, coating with the fused powder material injected in the plasma flame.

Expediently, the parts which are further distant from the plasma torch can be drawn back within the predetermined spray distance range through the plasma jet.

Advantageously, the parts to be coated are guided on a circular track through the plasma jet and rotatable about their own axis.

In an expedient embodiment, the parts to be coated are arranged on the satellites of a planetary drive unit.

Advantageously, after a complete rotation of the planetary drive the parts to be coated have rotated by a predetermined angle with reference to their starting position.

A further development of the invention consists in that a plurality of planetary drive units are movable sequentially into the plasma jet by means of a clock and/or index drive. For this purpose, they may be arranged on a large rotational table or they may be sequentially transported to the coating position and away again by means of a feed mechanism for the parts located internally of the chamber.

The spray distance range in which all parts to be coated are to be located is preferably determined by the melting temperature, heat conductivity, heat capacity, particle configuration and minimum and maximum particle size of the spray powder.

Furthermore, the plurality of parts to be coated are expediently capable of being cleaned by sputtering sequentially or in common by an arc of negative polarity on the parts, a plurality of parts can be heated by an arc of positive polarity on the parts and can be injected into the plasma flame and coated with fused spray powder particles. In this connection, the parts to be coated are expediently movable through the plasma jet with a speed such that during sputtering, cleaning and heating the arc burns continuously on the surfaces of the parts directed towards the plasma torch.

The invention is described in more detail in the following on the basis of exemplary embodiments and with reference to the drawings, in which.

Figure 1:
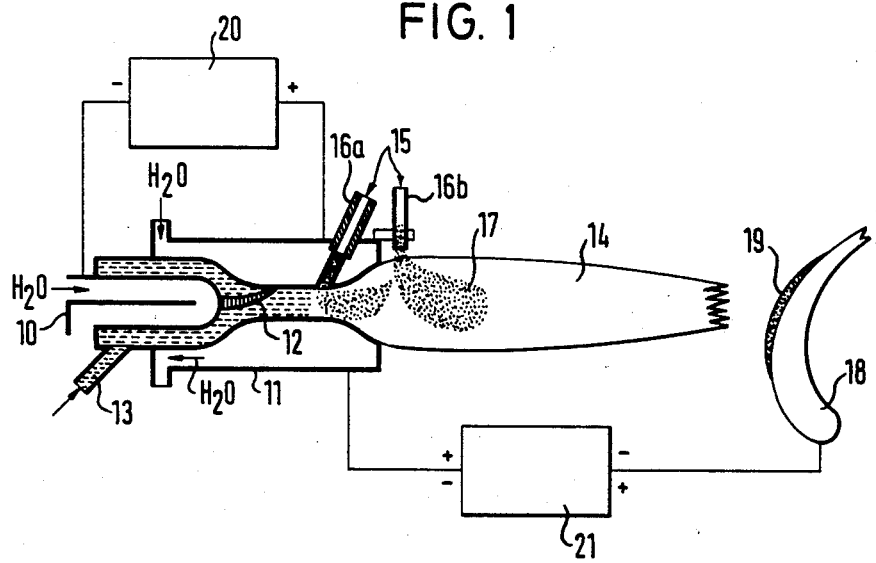
FIG. 1 shows a schematic representation of a vacuum coating installation with representation of only one of the parts to be coated.

The vacuum plasma spray (VPS) is a further development of the atmospheric plasma coating method (APS). It is distinguished from this principally only in that the coating process takes place in a vacuum chamber at low pressure. This change allows a whole series of advantages of which the most important are the following: dense and lower porosity spray layers result because in comparison with atmospheric spraying the spray speed in vacuum is approximately two to three times higher. The layers adhere even to smooth substrate surfaces since these are cleaned, before coating, of gas contamination, moisture and thin oxide skins with the aid of a transferred arc. Controlled substrate temperature adjustments during or after the coating reduce internal stresses in the sprayed layer and promote inter-diffusion processes between the layer and the carrier material. Since the coating process takes place in a vacuum, oxide free layers result. Reactive spray powders find no reaction partners and as a consequence layers of these powders have a consistent chemical composition. For the coating itself, as FIG. 1 shows schematically, an arc 12 is driven between two water cooled electrodes, a bar-formed cathode 10 and a nozzle shaped anode 11, the arc being compressed, narrowed down and wall stabilized in the nozzle shaped anode 11 by means of the gas 13 introduced into the plasma torch. The arc 12 heats, accelerates and ionizes the gas 13, whereby a plasma flame or a plasma jet 14 results. By means of the expansion of the plasma flame 14 in the low pressure, the gas atoms, ions and/or molecules are additionally accelerated, the nozzle configuration of the anode 11 corresponding to the pressure condition in the interior of the nozzle and being able to be optimised outside the vacuum chamber. With the aid of a carrier gas 15, spray powders 17 of a desired coating material are introduced into the plasma jet, accelerated, and heated, thereby softened and/or fused via powder injectors 16a 16b, which are arranged either inside or outside the anode 11, and upon impact on the surface of the work piece or part 18 to be coated are bonded to this as a spray layer 19. Between the cathode 10 and anode 11 a plasma stream supply 20 is connected and between the anode 11 and part 18 to be coated an arc current supply 21 is connected.

For each spray powder, the energy balance in the plasma flame must be so adjusted to the powder character, melting temperature, heat conductivity, heat capacity, particle configuration and particle fractionating, that the softening and/or fusing of as far as possible all injected particles actually takes place. In this connection, the injection conditions of the spray powder 17 in the plasma jet 14 also place a decisive role: the position of the injection opening, its diameter and adjustment angle in relation to the plasma jet direction and in the plane at right-angles to the plasma jet, powder feed rate and amount of carrier gas. In this connection it should be mentioned that for mixed layers, multi-layer and graded-layers a plurality of powder injectors can be operated simultaneously and/or sequentially and may be located in various positions, each of which has been optimized in accordance with the spray powder 17 to be injected therethrough.

Figure 2:
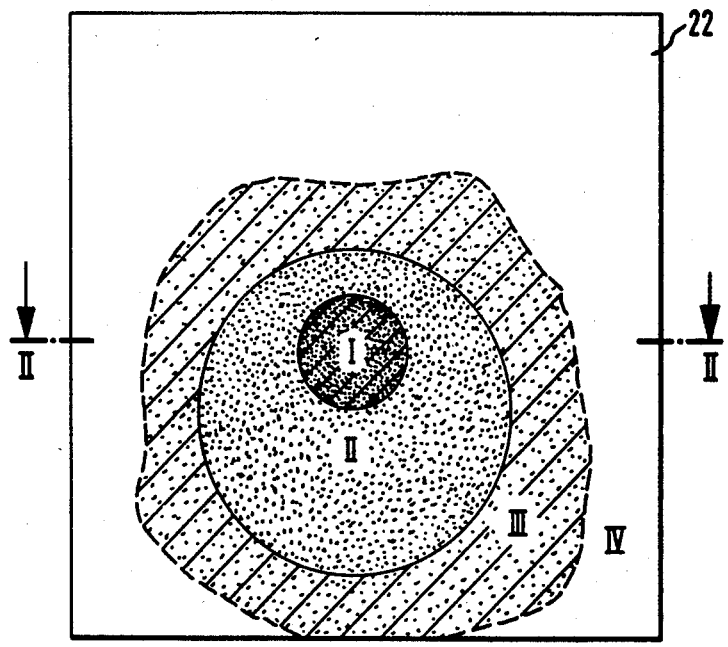
FIG. 2 shows a schematic representation of the coating efficiency in its optimised distribution across the plasma jet cross-section.
Figure 3:
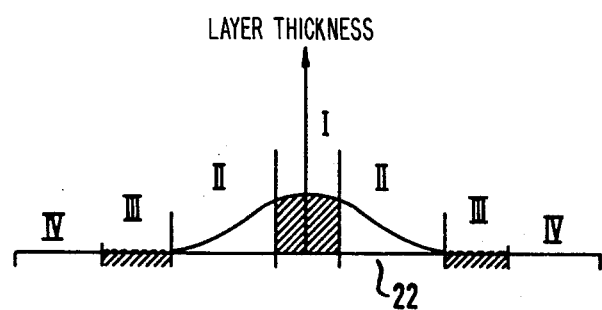
FIG. 3 shows the layer thickness distribution in a static spray image along the section line II-II in FIG. 2.

Thus it is achieved that, as known with spraying in atmosphere, the coating can be carried out with a concentrated spray jet which in its coating efficiency is as far as possible rotationally symmetric, the substrate surface being located at a defined distance in front of the anode opening. FIG. 2 shows schematically the coating efficiency distributed across the plasma jet cross section, assuming a static spray image onto the substrate plate 22 having larger dimensions than the plasma jet cross section. A spray coating distribution results which effectively sub-divides the substrate surface in relation to the layer thickness into four zones:

Zone I—The centre of the spray jet having high coating efficiency and effectively constant rate of increase in unit coating time, Zone II—in which the coating efficiency drops strongly with reducing distance from the centre, Zone III—within which the substrate surface meets only peripherally flying powder particles and practically no coherent spray layer results, and Zone IV—within which the substrate surface remains free from spray powder particles.

For uniform covering of the substrate plate 22 the plasma jet 14 must now be guided across the surface in a movement programme dependent upon the coating efficiency, in which connection up until now operation has been carried out whilst maintaining a fixed spray distance as is usual in atmospheric spraying. Surprisingly it results now in the VPS technology after optimising of the said injection conditions in collaboration with plasma energy and powder characteristics that the coating can take place not only with lateral eXtension of the spray jet cross section but also with a quite considerable variation of the spray distance whilst retaining the layer quality and whilst maintaining all the usual spray parameters.

In dependency on the low pressure in the chamber, the VPS-flame is about two to four times longer than the APS-flame, corresponding to a two to four times higher gas speed. Also the particle speed of the injected powder is higher in the VPS-coating than that in the APS-coating by the same order of magnitude. By means of the possibilities of variation of the powder injection at the anode, the dwell time of the spray powder, shortened by the higher particle speed, in zones of the plasma flame in which energy takeup for melting or softening is possible can be more than compensated by injection into substantially hotter jet zones. For a given spray powder with individual powder characteristics, particularly with a determined particle size fraction and a given ratio of surface volume it results that the smallest powder particle is, according to FIG. 4, softened, fused, and again only softened within the spray distance limits a,b. Thus it is in a condition which is necessary for the production of denser lower porosity spray coatings. Also for the largest spray powder particles present, spray distance boundaries a', b' can be determined within which this powder is suitable for spraying. T is the average temperature of the spray powder particle, d the distance from te point of injection. $T_s$ is the melting temperature, $D_D$ the vaporization temperature. The curves g,k are the curves for the largest and smallest powder particle of the particle fraction used.

Figure 4:
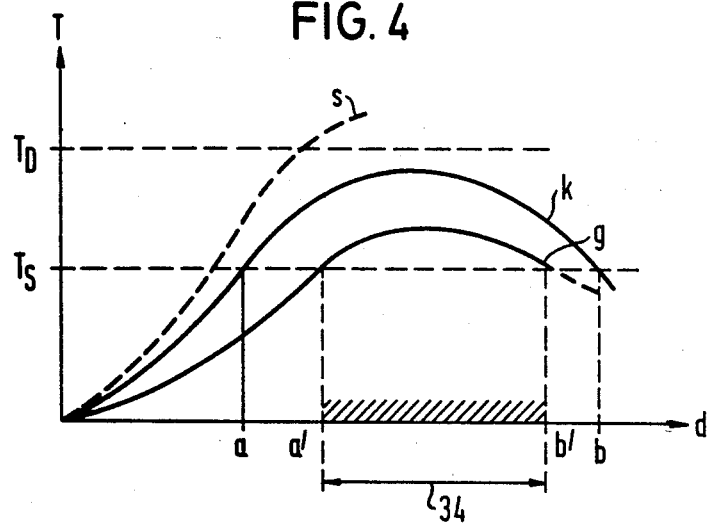
FIG. 4 shows schematically the dependency of the spray powder particle temperature after injection into the plasma flame in dependence upon the distance from the location of the injection in the flight direction for powder grains of various sizes.

The region of overlap of the curves for largest and smallest powder particles within which the minimum and maximum particles are at least softened determines a spray distance range. By suitable powder selection, this spray distance range is optimised:

The particles should be large enough that the vaporization temperature $D_D$ is not reached since they would otherwise be unavailable for coating (curve s in FIG. 4).

The maximum particle diameter is limited upwardly since the largest particles reduce the possible spray distance range.

By these limitations, the spray powder for VPS-coatings is defined.

In the following two differing application examples are described:

a.
  Metal powder of the alloyed type: NiCrAlY
  Particle fraction 5 to 37 microns (−400 mesh)
  Particle shape: spherical, argon-sprayed
  Desired VPS spray layer structure: dense spray layer, residual porosity ≦0, 5%, homogeneous.
  Plasma energy: 48 KW
  Chamber pressure: during spraying: 40 mbar
  Spray powder feed rate: 40 g per minute.
  Spray distance range: 120 mm.

b.
  Oxide powder of the type: $zrO_2 + 8\% Y_2O_3$
  Particle fraction: 10 to 60 microns
  Particle shape: broken, angular
  Desire VPS spray layer structure: very strongly porous spray layer, pores uniformly distributed across the layer cross-section.
  Plasma energy 52 kW.
  Chamber pressure during spraying: 150 mbar
  Spray powder feed rate: 20 g per minute
  Spray distance range: 140 mm.

Both application examples show that for very differing spray layer structures, very differing spray powders and, in dependence upon this, very differing spray parameters, always a surprisingly high spray distance range can be set within which the spray layer quality remains within predetermined limits. Thus, the possibility results of simultaneously coating a plurality of parts if the surfaces of these parts move in the plasma jet in such manner that they can remain only within the permissible spray distance range of spray powder particles.

Figure 5:
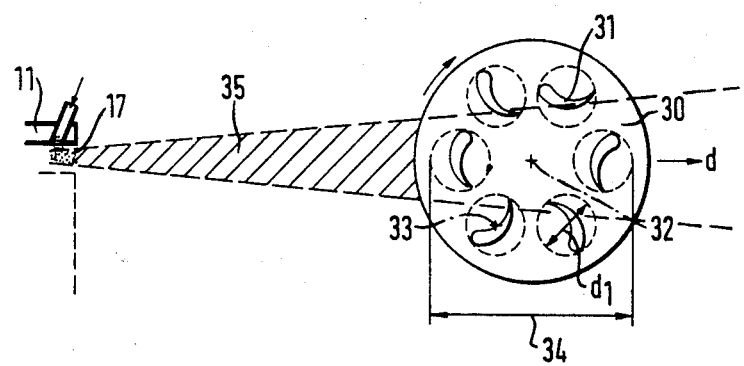
FIG. 5 shows schematically the simultaneous coating of six turbine blades arranged in a planetary drive unit within the predetermined spray distance range.

FIG. 5 shows schematically an arrangement in which a plurality of small turbine blades 31 to be coated having a maximum diameter $d_1$ rotate in a stationary planetary drive unit 30 about the central axis 32 of the planetary drive unit, and simultaneously rotate about their own axes 35, the dimensions of the planetary drive unit 30 being so chosen that all parts 31 move within the permissible spray distance range 34. Thus, it is ensured that the spray powder particles which fly past the nearest part 31 as a result of the lateral extension of the plasma jet 35 strike the remaining parts 31 located behind the foremost within the permissible spray distance range 34. Thus, simultaneously the exploitation of the coating process is greatly improved in that practically the entire plasma jet cross section contributes to the coating. The advantages of the present invention lie particularly in this and in the clear spray time reduction for the coating of a plurality of parts simultaneously in comparision with individual coating the advantages of the present invention particularly lie.

Simultaneous coating of a plurality of parts is as a consequence only desirable if the lateral extension of the plasma jet (Zone I and Zone II in FIG. 2) projects onto the surface of the part to be coated, and exceeds this in at least one direction. According to the size of the individual part to be coated, the planetary drive unit 30 can have 8,7,6,5,4 or at least 3 satellites, the number of satellite rotations around the axis 33 per rotation of the overall planetary system around the axis 32 e.g. with the aid of suitable gears being so set that after one complete rotation of the system about the axis 32, a part 31 is located in a position relative to the plasma jet 35 which is rotated by a certain angle about the axis 33 in comparison with the position in the preceding rotation.

In the following an example will be given of this: for the already mentioned NiCrAlY-spray powder at a chamber pressure of 40 mbars the possible spray distance range of 34 to 120 mm results. For turbine blades 31 having a maximum diameter $d_1 = 37$ mm, the planetary drive unit 30 can have six satellites. For uniform layer coating distribution all turbine blade surfaces (turbine foot, blade, leading edges, transition zones and platforms) all six satellites have a ratio of satellite rotation per rotation of the planetary system about the central axis 32 of e.g. 2,53. Thus, the position of the individual satellites after execution of a complete rotation about the central axis 32 as rotated by about 15 degrees.

Figure 6:
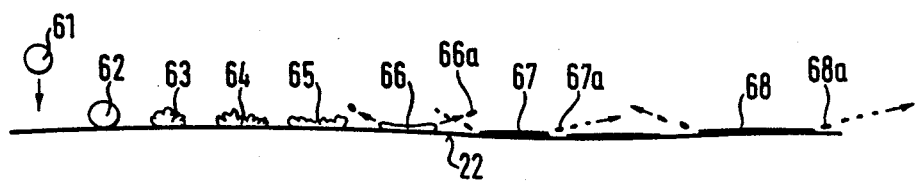
FIG. 6 shows schematically the deformation of the spray powder particles after impact on the substrate surface in dependance upon the particle temperature.

In addition to the two mentioned advantages of the multiple coating according to the invention (exploitation of the lateral extension of the plasma jet, shortening of the coating time) surprisingly a yet further increase of the coating efficiency occurs which additionally promote the coating quality and the coating uniformity on the surfaces of the parts to be coated. As is illustrated in FIG. 6, a spray powder particle 61 deforms more strongly upon impact with the substrate surface 22 (particle 62 to 68) the softer the spray particle is, i.e. the more strongly it has been heated in the plasma jet.

Beyond a determined degree of softening (boundary between particle 65 and particle 66) the deformation after impact is so large that a part 66a of the particle is reflected. With still further increase of particle temperature (particle 67,68) the spray loss increases as a result of partial reflection. The resulting layer is in contrast more dense and the residual porosity is smaller the higher the particle temperature upon impact onto the substrate surface 32. Since with coating of a plurality of parts simultaneously practically the entire proportion of reflected spray is captured by the neighbouring probes, it is possible to spray with particle temperatures which permit very high spray layer densities without the coating efficiency being substantially reduced. This spray loss by partial reflection is also responsible for the fact that e.g. concave coating surfaces in individual partial coating possess a higher layer density than convex surfaces with otherwise similar coating conditions. With the multiple coating according to the invention with a planetary drive unit, the spray loss by partial reflection is used again for coating which e.g. practically equalizes the coating thickness differences of the convex suction side of a turbine blade and the concave pressure side.

Figure 7:
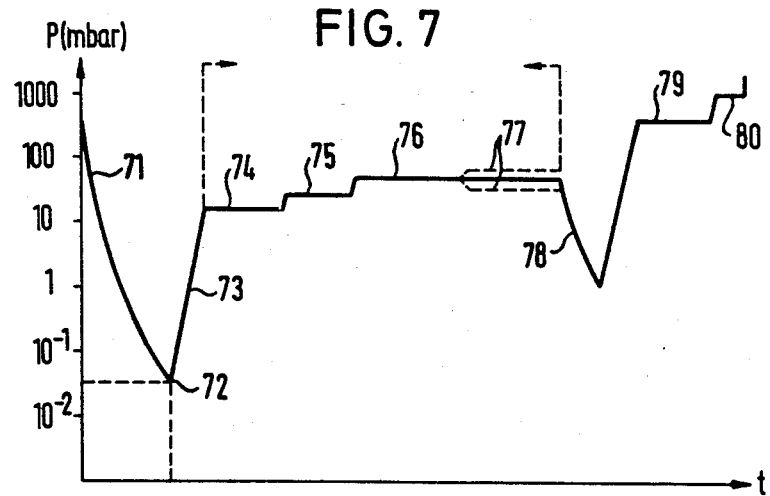
FIG. 7 schematically shows the time dependence of a vacuum plasma coating cycle in a pressure time diagram.

The vacuum plasma coating of a part includes a plurality of working stages. FIG. 7 shows schematically the course of a vacuum plasma coating cycle by means of a pressure time diagram. After evacuation of the vacuum chamber (curve section 71) to a predetermined end point 72, a determined low pressure 74 is set in the chamber by a means of argon-gas supply (curve section 73) in which first the surface of the parts to be coated are cleaned with the aid of the transferred arc with negative polarity on the part in a sputtering process. Gas contamination, moisture and oxide layers are sputtered off. This leads to clear adhesion improvement of the sprayed layers. In addition to purely mechanical denticulation of the spray layer as a result of roughening of the surface of the part to be coated by sandblasting, contributions to adhesion include the neutralization of free surface energy of the clean substrate by means of the coating material. If now a plurality of parts are to be coated simultaneously, they must be simultaneously cleaned previously as a unit. This is carried out in that the entire planetary drive unit 30 is located in the circuit of the transferred arc. During the cleaning and also later during heating (curve section 75) with the aid of the transferred arc of positive plurality on the planetary drive unit 30, this is rotated with a rotational speed sufficiently higher that the individual satellites appear as if they form an optically closed ring surface on which the front of the transferred arc opposite the plasma torch burns continuously. Since after each rotation of the planet the individual satellites have moved beyond their original position by a determined angle, the entire surface of the parts to be coated is cleaned and/or heated. The current of the transferred arc is in this connection continuously divided between at least two of the parts to be coated. By this means, the adaption of the current density to the surface configuration of the parts being coated is not critical. The danger of destruction and/or overheating of regions having less material, such as e.g. the outlet edge of a turbine blade, is greatly reduced.

After cleaning and heating, which need not necessarily take place with differing low pressures in the chamber, coating takes place (curve section 76) and if a plurality of coatings are desired, further coating (curve section 77) takes place at the vacuum necessary for this. After the coating, evacuation takes place once more (curve section 78) in order to reduce the $H_2$ concentration in the chamber if the operation has been carried out with the addition of $H_2$ to the plasma gas. Then flooding to a determined pressure level 79 with argon takes place in order to cool the coated parts to the temperature at which the vacuum chamber can be flooded with air without danger to the layers, in order to open it and to exchange the coated parts.

With the aid of an internal handling system, for increase of the apparatus productivity, a plurality of parts can in one vacuum cycle be sputter cleaned, heated and coated. Furthermore, a plurality of planetary drive units can be sequentially sputter cleaned, heated and coated which e.g. are arranged on a large rotation table in a ring, an index drive bringing one planetary drive unit after the other into the position of the plasma jet. It is also conceivable that a component feed mechanism within the chamber transports the planetary drive units sequentially to the coating position and then away again.

I claim:

1. Vacuum plasma coating apparatus comprising: means for supporting a plurality of parts to be coated in a manner for moving the parts with a plurality of degrees of freedom; and a plasma torch for producing a plasma jet and arranged in a chamber for displacement along a plurality of axes relative to the part to be coated; said means for moving the parts to be coated being arranged to move the parts simultaneously or sequentially through the plasma jet, the part nearest the plasma torch at any moment being arranged in the plasma jet in such manner that the jet extends at least occasionally laterally beyond an outer dimension of the part, and all parts to be coated moving within a predetermined spray distance range when they are located in the plasma jet.

2. Vacuum plasma coating apparatus according to claim 1 wherein said moving means is such that the parts located furthest from the plasma torch within the predetermined spray distance range can be guided back through the plasma jet.

3. Vacuum plasma coating apparatus according to claim 2 wherein the parts to be coated are guidable on a circular path through the plasma jet and are mounted for rotation about their own axes.

4. Vacuum plasma coating apparatus according to claim 1 wherein the parts to be coated are arranged on the satellites of a planetary drive unit.

5. Vacuum plasma coating apparatus according to claim 4 wherein a plurality of planetary drive units are arranged for sequential movement into the plasma jet.

6. Vacuum plasma coating apparatus according to claim 5 wherein the planetary drive units are arranged on a rotational table.

7. Vacuum plasma coating apparatus according to claim 1 wherein the spray distance range is determined by melting temperature, heat conductivity, heat capacity, particle configuration and minimum and maximum particle size of the spray powder.

8. Vacuum plasma coating apparatus according to claim 1 wherein the moving means is such that after a complete rotation about a central axis the parts to be coated have moved about their own axes beyond their initial position by a predetermined rotational angle.

9. Vacuum plasma coating apparatus according to claim 1 wherein means are provided for cleaning the plurality of parts by sputtering sequentially or together by forming an arc of negative polarity on the parts, wherein means are provided for heating the parts by an arc of positive polarity on the parts and wherein means are provided for coating the parts by spray powder particles injected into the plasma flame and melted.

10. Vacuum plasma coating apparatus according to claim 9 wherein the parts to be coated are movable through the plasma jet with a speed such that upon sputter cleaning and upon heating the arc burns continuously on the surfaces of the parts facing the plasma torch.

11. A method of coating a plurality of parts in which the parts are moved through a plasma jet produced by a torch in such manner that the jet extends laterally at least occasionally beyond the parts closest to the torch, the parts moving with at least two degrees of freedom and the parts being within a predetermined spray distance range at least when located in the plasma jet.

* * * * *

REEXAMINATION CERTIFICATE (1143rd)
United States Patent [19]
Gruner

[11] B1 4,596,718
[45] Certificate Issued Oct. 17, 1989

[54] VACUUM PLASMA COATING APPARATUS

[75] Inventor: Heiko Gruner, Beinwiel am See, Switzerland

[73] Assignee: Plasmainvent AG, Zug, Switzerland

Reexamination Request:
No. 90/001,486, Apr. 6, 1988

Reexamination Certificate for:
Patent No.: 4,596,718
Issued: Jun. 24, 1986
Appl. No.: 746,105
Filed: Jun. 18, 1985

[30] Foreign Application Priority Data

Jun. 19, 1984 [DE] Fed. Rep. of Germany ....... 3422718

[51] Int. Cl.⁴ .............................................. B05D 1/08
[52] U.S. Cl. ............................... 427/34; 219/121 PL; 219/121 P; 427/295; 427/423; 427/425
[58] Field of Search ................. 427/34, 423, 295, 425; 219/121 PL, 121 P

[56] References Cited

U.S. PATENT DOCUMENTS

| | | | |
|---|---|---|---|
| 2,461,657 | 2/1949 | Paasche | 91/45 |
| 3,010,009 | 11/1961 | Ducati | 219/76 |
| 3,493,415 | 2/1970 | Grisaffe et al. | 417/50 |
| 3,839,618 | 10/1974 | Muehlberger | 219/121 P |
| 3,853,091 | 12/1974 | Christensen et al. | 118/49 |
| 4,082,870 | 4/1978 | Yenni | 427/425 |
| 4,328,257 | 5/1982 | Muehlberger et al. | 427/34 |
| 4,358,471 | 11/1982 | Derkacs et al. | 427/9 |

FOREIGN PATENT DOCUMENTS

| | | |
|---|---|---|
| 493837 | 6/1953 | Canada. |
| 530979 | 9/1956 | Canada. |
| 2053802 | 5/1972 | Fed. Rep. of Germany. |
| 3271 | 3/1938 | Japan. |
| 13518 | 4/1939 | Japan. |
| 39330 | 12/1972 | Japan. |
| 135465 | 11/1974 | Japan. |
| 1240700 | 7/1971 | United Kingdom. |

OTHER PUBLICATIONS

English Language Translation of German Patent No. 2053802.

*Primary Examiner*—Bernard D. Pianalto

[57] ABSTRACT

A vacuum plasma coating apparatus comprises a plasma torch arranged in a low pressure chamber and displaceable along a plurality of axes relative to the part to be coated and a device for moving the part to be coated with a plurality of degrees of freedom simultaneously with the plasma torch. In order to be able to coat a plurality of parts simultaneously with great effectiveness, a device for moving the part to be coated is constructed in such manner that it can contain a plurality of parts simultaneously, the parts being movable simultaneously and/or sequentially through the plasma jet. In each case the part nearest the plasma torch is arranged in the plasma jet in such manner that this extends at least occasionally laterally beyond an outer dimension of this part and all parts to be coated move within a predetermined spray distance range when they are located in the plasma jet.

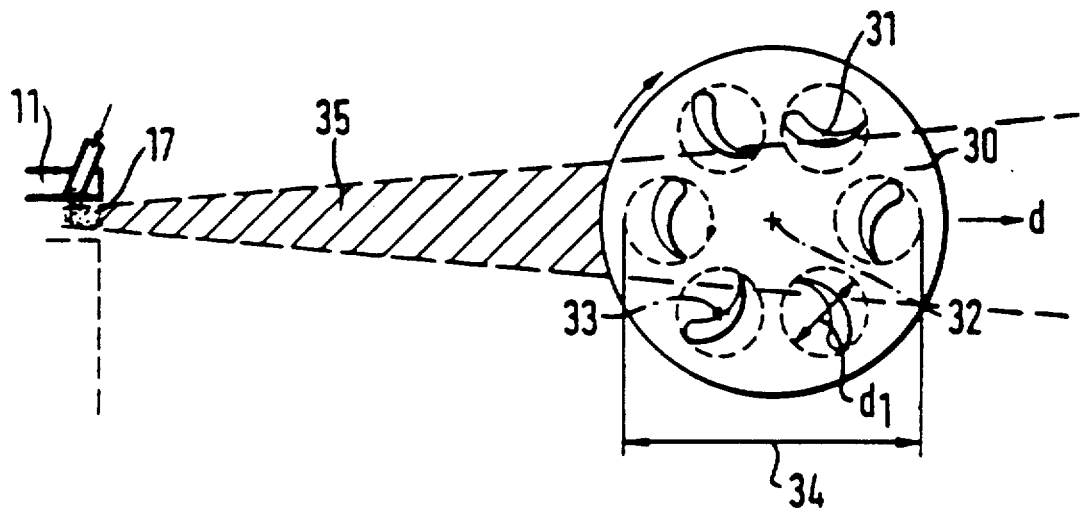

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1 and 11 are determined to be patentable as amended.

Claims 2–10, dependent on an amended claim, are determined to be patentable.

1. Vacuum plasma coating apparatus comprising: means for supporting a plurality of parts to be coated in a manner for moving the parts with a plurality of degrees of freedom; and a plasma torch for producing a plasma jet and arranged in a *vacuum* chamber for displacement along a plurality of axes relative to the part to be coated; said means for moving the parts to be coated being arranged to move the parts simultaneously or sequentially through the plasma jet, the part nearest the plasma torch at any moment being arranged in the plasma jet in such manner that the jet extends at least occasionally laterally beyond an outer dimension of the part, and all parts to be coated moving within a predetermined spray distance range when they are located in the plasma jet, *said predetermined spray distance range defined as a distance range from the plasma torch within which a plasma sprayed material remains in at least a softened state, and wherein a plurality of parts are coated simultaneously.*

11. A method of coating a plurality of parts in which the parts are moved *in a vacuum chamber* through a plasma jet produced by a torch in such manner that the jet extends laterally at least occasionally beyond the parts closest to the torch, the parts moving with at least two degrees of freedom and the parts being within a predetermined spray distance range at least when located in the plasma jet, *said predetermined spray distance range defined as a distance range from the plasma torch within which a plasma sprayed material remains in at least a softened state, and wherein a plurality of parts are coated simultaneously.*

* * * * *